(12) United States Patent
Srivastav et al.

(10) Patent No.: US 10,867,522 B1
(45) Date of Patent: Dec. 15, 2020

(54) SYSTEMS AND METHODS FOR VEHICLE PUSHBACK COLLISION NOTIFICATION AND AVOIDANCE

(71) Applicant: Honeywell International Inc., Morris Plains, NJ (US)

(72) Inventors: Amit Srivastav, Morris Plains, NJ (US); Rajesh Chenchu, Morris Plains, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/553,630

(22) Filed: Aug. 28, 2019

(51) Int. Cl.
*G08G 5/04* (2006.01)
*G08G 5/06* (2006.01)
*G06K 9/00* (2006.01)
*B64D 47/08* (2006.01)

(52) U.S. Cl.
CPC ............. *G08G 5/065* (2013.01); *B64D 47/08* (2013.01); *G06K 9/00791* (2013.01)

(58) Field of Classification Search
CPC .................................................... G08G 5/065
USPC ....... 340/961, 903, 905, 907, 435, 436, 438, 340/932.2; 701/120, 301
See application file for complete search history.

(56) References Cited

U.S. PATENT DOCUMENTS

| 10,217,371 | B1 | 2/2019 | Pesik et al. | |
|---|---|---|---|---|
| 2008/0062011 | A1 | 3/2008 | Butler et al. | |
| 2009/0164122 | A1* | 6/2009 | Morbey | G08G 5/045 701/301 |
| 2014/0062756 | A1* | 3/2014 | Lamkin | G01S 7/04 342/29 |
| 2014/0142838 | A1 | 5/2014 | Durand | |

FOREIGN PATENT DOCUMENTS

WO 2016086278 A1 6/2016

* cited by examiner

*Primary Examiner* — Tai T Nguyen
(74) *Attorney, Agent, or Firm* — Bookoff McAndrews, PLLC

(57) ABSTRACT

Disclosed are systems, methods, and non-transitory computer-readable medium for vehicle collision notification and avoidance. One system may include attaching at least one camera to a vehicle, receiving vehicle information and geographic information regarding the vehicle and at least one other vehicle. The system may also include predicting a next position of the vehicle and the other vehicle, and determine whether the vehicle will collide with the other vehicle based on a comparison of the next position of the vehicle and the next position of the other vehicle. The system may also include generating a graphical representation of the collision of the vehicle and the other vehicle and may transmit the graphic representation to a user device.

20 Claims, 5 Drawing Sheets

SYSTEMS AND METHODS FOR VEHICLE PUSHBACK COLLISION NOTIFICATION AND AVOIDANCE

TECHNICAL FIELD

Various embodiments of the present disclosure generally relate to a connected service-oriented architecture of vehicle pushback collision notification and avoidance, and more particularly, to providing graphical or other notification of potential collisions between vehicles maneuvering during ground operations.

BACKGROUND

Terminal gate and ramp areas in airports may be very congested places, with simultaneously arriving and departing aircraft and ground service vehicles and ground personnel servicing and directing aircraft into and out of gates. The avoidance of collision incidents in this area involves careful monitoring and control of the locations and movement of aircraft and other vehicles as they maneuver within these areas. Pushback operations may involve interaction or even collision between and among personnel, aircraft, and/or equipment. Typically, aircraft are pushed back with tug vehicles, and the tug driver is assisted by ground personnel to guide and move the aircraft in reverse as it is simultaneously being turned to a location where the aircraft can start its engines and move forward to a taxiway. At many, if not most, airports, the environment surrounding the aircraft is monitored by these ground personnel and the tug driver. These support personnel may communicate updates and status to the pilot through universal visual signals and additional voice communications.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF DISCLOSURE

According to certain aspects of the disclosure, systems and methods are disclosed to provide vehicle pushback collision notification and avoidance through a connected services platform.

In one embodiment, a computer-implemented method is disclosed for vehicle collision notification and avoidance, the method may comprise establishing a field of view video of at least one camera coupled to a vehicle; transmitting the field of view video of the at least one camera coupled to the vehicle to a user device; receiving vehicle information regarding the vehicle; receiving other vehicle information regarding at least one other vehicle in the field of view video of the at least one camera coupled to the vehicle; receiving geographic information regarding the location of the vehicle and the other vehicle; predicting a next position of the vehicle based on the vehicle information and the geographic information; predicting a next position of the other vehicle based on the other vehicle information and the geographic information; determining whether the vehicle will collide with the other vehicle based on a comparison of the next position of the vehicle to the next position of the other vehicle; generating a graphical representation in the field of view video of the at least one camera coupled to the vehicle, wherein the graphical representation represents the collision of the vehicle and the other vehicle; and transmitting the graphical representation of the collision of the vehicle and the other vehicle to the user device.

In accordance with another embodiment, a computer-implemented system is disclosed for vehicle collision notification and avoidance, the computer-implemented system may comprise, a memory having processor-readable instructions stored therein; and at least one processor configured to access the memory and execute the processor-readable instructions, which when executed by the processor configures the processor to perform functions for: establishing a field of view video of at least one camera coupled to a vehicle; transmitting the field of view video of the at least one camera coupled to the vehicle to a user device; receiving vehicle information regarding the vehicle; receiving other vehicle information regarding at least one other vehicle in the field of view video of the at least one camera coupled to the vehicle; receiving geographic information regarding the location of the vehicle and the other vehicle; predicting a next position of the vehicle based on the vehicle information and the geographic information; predicting a next position of the other vehicle based on the other vehicle information and the geographic information; determining whether the vehicle will collide with the other vehicle based on a comparison of the next position of the vehicle to the next position of the other vehicle; generating a graphical representation in the field of view video of the at least one camera coupled to the vehicle, wherein the graphical representation represents the collision of the vehicle and the other vehicle; and transmitting the graphical representation of the collision of the vehicle and the other vehicle to the user device.

In accordance with another embodiment, a non-transitory computer-readable medium is disclosed for vehicle collision notification and avoidance. The non-transitory computer readable medium may contain instructions for: establishing a field of view video of at least one camera coupled to a vehicle; transmitting the field of view video of the at least one camera coupled to the vehicle to a user device; receiving vehicle information regarding the vehicle; receiving other vehicle information regarding at least one other vehicle in the field of view video of the at least one camera coupled to the vehicle; receiving geographic information regarding the location of the vehicle and the other vehicle; predicting a next position of the vehicle based on the vehicle information and the geographic information; predicting a next position of the other vehicle based on the other vehicle information and the geographic information; determining whether the vehicle will collide with the other vehicle based on a comparison of the next position of the vehicle to the next position of the other vehicle; generating a graphical representation in the field of view video of the at least one camera coupled to the vehicle, wherein the graphical representation represents the collision of the vehicle and the other vehicle; and transmitting the graphical representation of the collision of the vehicle and the other vehicle to the user device.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
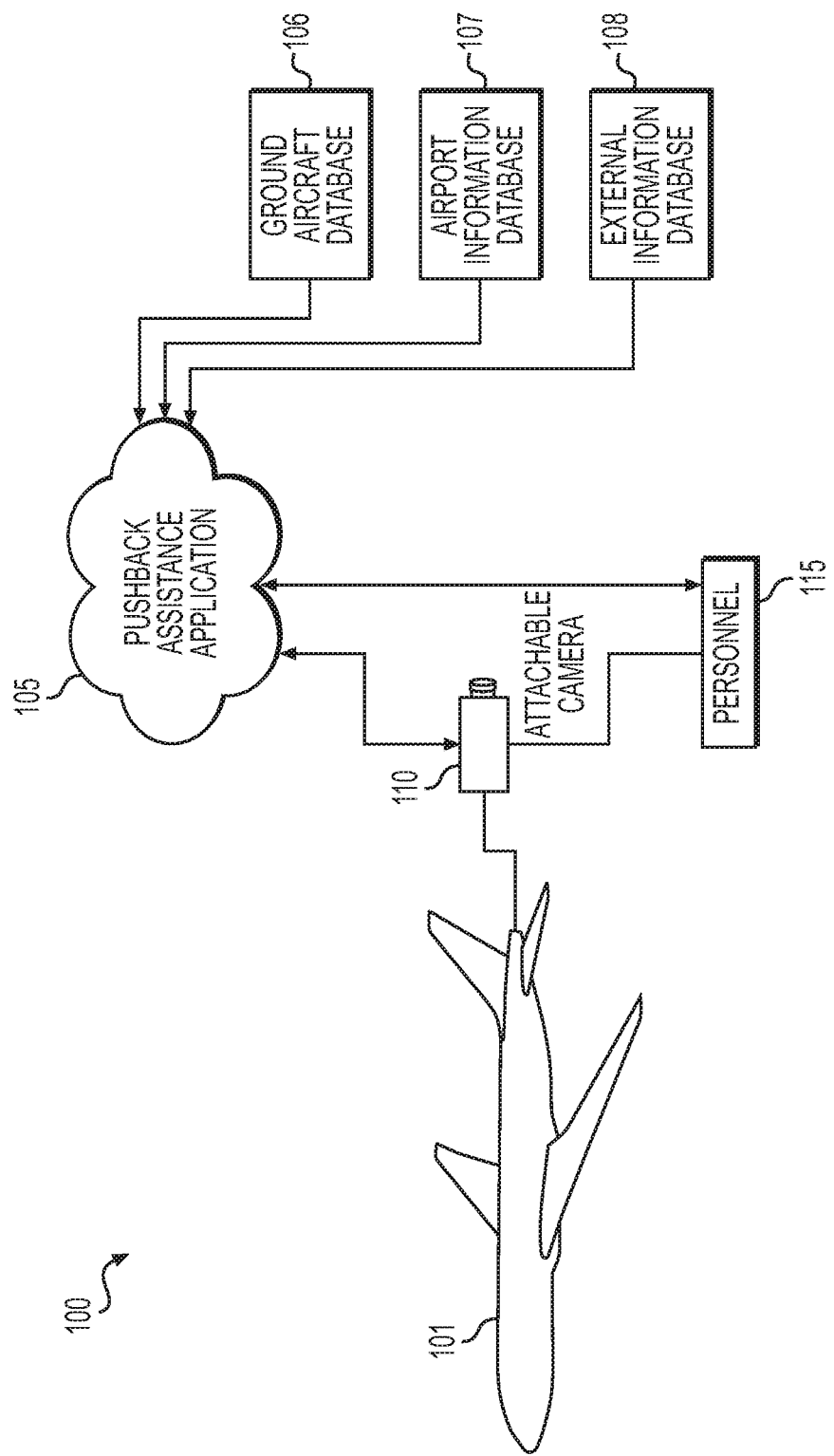
FIG. 1 depicts an overview of the system for vehicle collision notification and avoidance, according to one aspect of the present disclosure.

As described above, the pushback operation of an aircraft may involve interaction or even collision between and among personnel, aircraft, and/or equipment. Given the expected air traffic growth, there exists a need for analysis of incidents involving collisions between the pushed aircraft and other moving or stationary objects operating on the airport tarmac to determine solutions for aircraft pushback collision prevention.

The current disclosure provides an improvement to the vehicle pushback process. The vehicle pushback collision notification and avoidance system may incorporate attachable and detachable camera systems for improving pushback operations, in which the camera system may establish a wireless video feed to a monitoring device under control by ground personnel, tug vehicle driver, or a remote controller for monitoring the areas surrounding the aircraft. The vehicle pushback collision notification and avoidance system may also include a ground based collision avoidance algorithm using aircraft historical ramp area pushback trajectory data and/or airport surface models and an ahead position algorithm to predict future positions of various aircrafts and objects on the airport tarmac.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 depicts an overview of system 100 for vehicle collision notification and avoidance, according to one aspect of the present disclosure. While aircraft are referenced herein as an exemplary vehicle for the system and methods described herein, it will be understood that this disclosure is not limited to aircrafts and may apply to other vehicles, such as cargo haulers, buses, and/or other vehicles.

System 100 may include an aircraft 101, a pushback assistance application 105, attachable camera 110, ground personnel 115, ground aircraft database 106, airport information database 107, and external information database 108. The ground personnel 115 may include ground crew who walk beside the aircraft during pushback operation, and tug vehicle driver. Ground aircraft database 106 may include position information and speed information regarding the subject aircraft and other external aircraft and objects, aircraft structural information, aircraft safe zone radius ring information, and wing tip separation clearance distance information. Airport information database 107 may include airport surface models, obstacles, guidance line markings, surface historical trajectory, and performance data. External information database 108 may store information related to aircraft pushback or taxiway/runway clearance information.

The attachable camera 110 may be one or more cameras that may be temporarily or at least removably coupled to any desired location of the aircraft. Alternatively the attachable camera 110 may in fact be a fixed camera that is integrated into the body of the aircraft, either as OEM equipment or as after-market equipment. While the attachable camera 110 may be coupled to any desired location of the aircraft, in one embodiment, attachable camera 110 may be coupled to the rear part of the aircraft by ground personnel. In one embodiment, multiple attachable cameras may be coupled to multiple locations of the exterior of the aircraft to cover the complete surroundings of the aircraft. For example, in one embodiment, one or more cameras 110 may be configured for capturing 360 degree view and different types of cameras may be used. For example, RGB camera, infrared (IR) camera, thermal camera, or RGB-D depth camera may all be used individually or together coupled to the aircraft. The camera 110 may include a wireless communication unit to transfer the live captured video to monitoring devices or to a remote server. The ground personnel 115 may have devices that receive the live captured video communication from camera 110. Devices capable of receiving live capture video may include smartphones, laptops, tablets, desktop computers, and wearable devices such as smart glasses, virtual reality headsets, augmented reality headsets, and smart watches.

As indicated above, FIG. 1 is provided merely as an example. Other examples are possible and may differ from what is described with regard to FIG. 1. The number and arrangement of devices and networks shown in FIG. 1 are provided as an example. In practice, there may be additional devices, fewer devices and/or networks, different devices and/or networks, or differently arranged devices and/or networks than those shown in FIG. 1. Additionally, or alternatively, a set of devices (e.g., one or more devices) of system 100 may perform one or more functions described as being performed by another set of devices of system 100.

Figure 2:
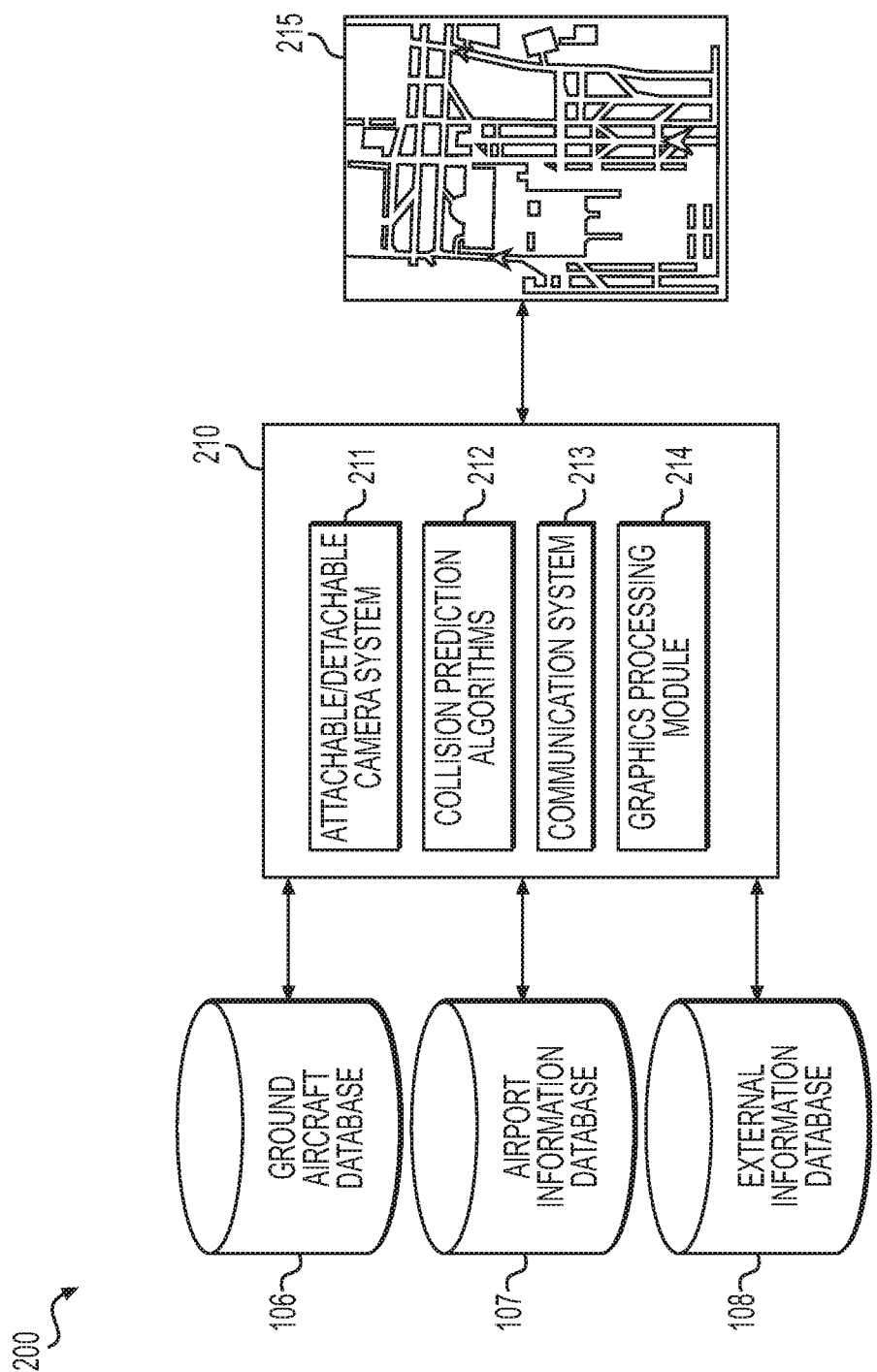
FIG. 2 depicts an exemplary high level system architecture of the collision notification and avoidance system, according to one aspect of the present disclosure.

FIG. 2 depicts an exemplary high level system architecture environment 200 of the collision notification and avoidance system, according to one aspect of the present disclosure. Environment 200 may include ground aircraft database 106, airport information database 107, external information database 108, pushback collision prevention system 210, and display 215.

The pushback collision prevention system 210 may include attachable camera system 211, collision prediction module 212, communication system 213, and graphics processing module 214. The attachable camera system corresponds to the attachable camera 110 depicts in FIG. 1, and may perform similar functions. The collision prediction module 212, communication system 213, and graphics processing module 214 may correspond to the pushback assistance application 105 depicted in FIG. 1. The collision prediction module 212 may incorporate collision prediction algorithms to predict potential collision between a pushback aircraft and other external obstacles. The collision detection algorithms may use both computer vision techniques and regression models for predicting possible collisions between other aircrafts and obstacles and the pushback aircraft. The computer vision techniques may utilize the video feed supplied by the attachable camera system 211 to identify other aircrafts and obstacles surrounding the pushback aircraft. For example, the attachable camera system 211 may be a set of RGB-D cameras, and collision detection algorithms may use a depth map provided by the set of RGB-D cameras to precisely measure the relative distance to any potential obstacles. The collision detection algorithms may also utilize an estimated depth map obtained from computer vision techniques from a set of RGB cameras to measure the relative distance to any potential obstacles. The regression models may use vehicle or aircraft position information, aircraft wingtip separation clearance distance information, and aircraft structural information from ground aircraft database 106, speed and airport surface model information, and historical pushback trajectory data of specific parking zones from airport information database 107 and aircraft clearance path information from external information database 108 to predict the position of pushback aircraft at time "t+delta", where "t" is the current time and "delta" is the amount of time ahead.

If a potential collision is detected between the pushback aircraft and other aircrafts and obstacles, the collision prediction module 212 may generate an alert. The alert may be either or both an audible alert, such as a siren, or a visual alert. Visual alerts may be generated via the graphics processing module 214, and may be a markup to the live camera feed marking the threat objects and transmit the marked up feed to the display 215 via the communication system 213. The display 215 depicted in FIG. 2 may be the display of the device used by ground personnel 115. The marked up video feed may be in the form of augmented reality or virtual reality and may be transmitted to the mobile device or wearable device operated by the ground personnel, or may be transmitted as a heads up display. The video feed may also include a navigation display depicting the taxiway and routes the aircraft can follow. The ground personnel may use the video feed to monitor other vehicles or aircraft locations and obstacles surrounding the pushback aircraft and guide the complete pushback operation.

In one embodiment, the collision prediction module 212 may be implemented at a central server at an airport or at a remote server. In another embodiment, collision prediction module 212 may be implemented at an end-user device, for example on a tug driver vehicle, to avoid data transmission delays between systems or different geographic locations.

The number and arrangement of modules, devices, and networks shown in FIG. 2 are provided as an example. In practice, there may be additional modules and devices, fewer modules, devices and/or networks, different modules, devices and/or networks, or differently arranged modules, devices and/or networks than those shown in FIG. 2. Furthermore, two or more devices included in environment 200 of FIG. 2 may be implemented within a single device, or a single device in the environment 200 of FIG. 2 may be implemented as multiple, distributed devices. Additionally, or alternatively, a set of devices (e.g., one or more devices) of environment 200 may perform one or more functions described as being performed by another set of devices of environment 200.

Figure 3:
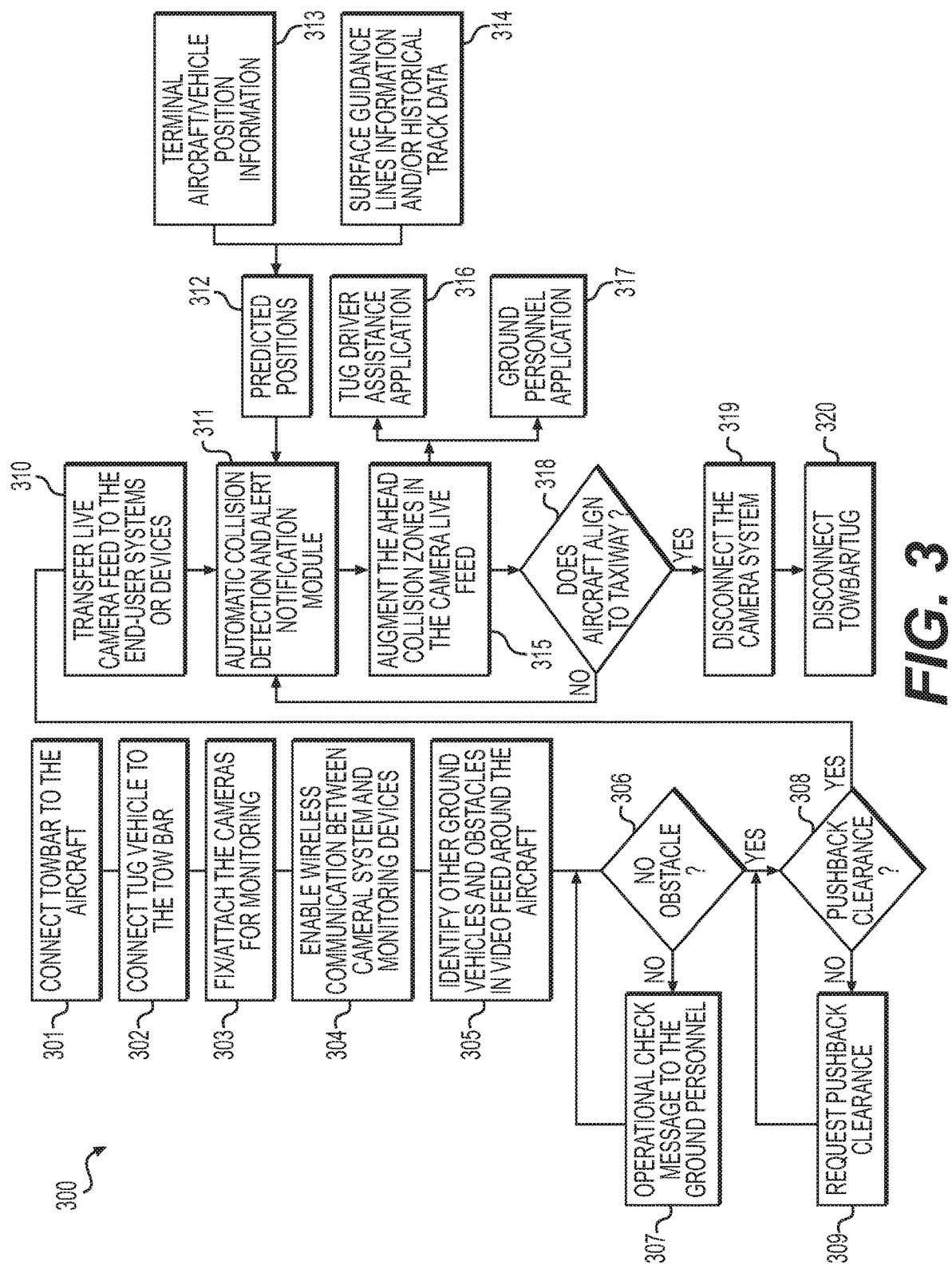
FIG. 3 depicts a flowchart of an exemplary method for vehicle collision notification and avoidance, according to one aspect of the present disclosure.

FIG. 3 depicts a flowchart of an exemplary method 300 for vehicle collision notification and avoidance, according to one aspect of the present disclosure.

The exemplary method 300 begins at step 301, at the start of the aircraft pushback operation a tow bar may be connected to the aircraft. At step 302, a tug vehicle may be connected to the other side of the tow bar. At step 303, the ground personnel may attach or fix the one or more cameras on the aircraft to monitor the area surrounding the aircraft. At step 304, communication between the one or more cameras and the ground personnel and/or tug vehicle driver may be established. At step 305, other ground vehicles and obstacles around the aircraft may be identified. The identification may be performed by the ground personnel by marking in the view feed the location of obstacles, or the identification may also be perform by machine vision learning. At step 306, a determination may be made whether obstacles are present, if there are obstacles present, then an operation check message may be sent to the ground personnel at step 307, and then the determination at step 306 is repeated. If there are no obstacles present, then the method proceeds to step 308 to determine if pushback clearance has been received by the aircraft. If pushback clearance has not been received, then at step 309 a pushback clearance is requested and step 308 is repeated. If pushback clearance has been received, then the method proceeds to step 310 where live video feed from the coupled cameras may be transmitted to end user systems or devices, for example devices used by ground personnel or tug vehicle drivers, or in cockpit devices operated by the flight crew, or to a remote controller. At step 311 and 312, the terminal aircraft and vehicle position information, and surface guidance lines information and historical track data may be provided to determine predicted positions of the aircraft and vehicle surrounding the pushback aircraft at step 313. The terminal aircraft and position information may include information transmitted by the Automatic Dependent Surveillance-Broadcast (ADS-B) and other tug vehicles in situations where an aircraft does not transmit the location information on its own. The predicted positions then may be transmitted to the automatic collision detection and alert notification module at step 314 where the module may perform the collision detection algorithms to determine if any collisions are possible. Any collisions may be determined by the module by predicting the next possible vehicle or aircraft position at "t+delta" using regression models. At step 315, if there are any collisions imminent then the areas of collision may be marked in the video feed of the camera. The areas of collision may be marked by different colors, for example areas of collision may be shaded in red. The areas of collision may be marked by shapes, for example the areas of collision may be highlighted in a square box. The areas of collision may also be marked with animation, for example an animation of the aircraft colliding may be drawn in the live feed. The augmented camera video feed indicating the areas of collision may then be transmitted to the tug driver assistance application residing in a tug vehicle at step 316, and may be transmitted to the ground personnel application, for example executed on the ground personnel device, at step 317. At step 318, a determination may be made to determine if the aircraft is aligned to taxiway. If the determination is no, then the process may return to step 314 to continue to determine if any collisions are imminent. If the determination is yes, that the aircraft is aligned to taxiway then the aircraft pushback operation may be completed, at step 319 the camera system is disconnected from the aircraft by the ground personnel. At step 320 the aircraft may be disconnected from the towbar and the tug vehicle, the aircraft may proceed to the takeoff operation.

Although FIG. 3 shows example blocks, in some implementations, method 300 may include additional blocks, fewer blocks, different blocks, or differently arranged blocks than those depicted in FIG. 3. Additionally, or alternatively, two or more of the blocks of method 300 may be performed in parallel.

Figure 4:
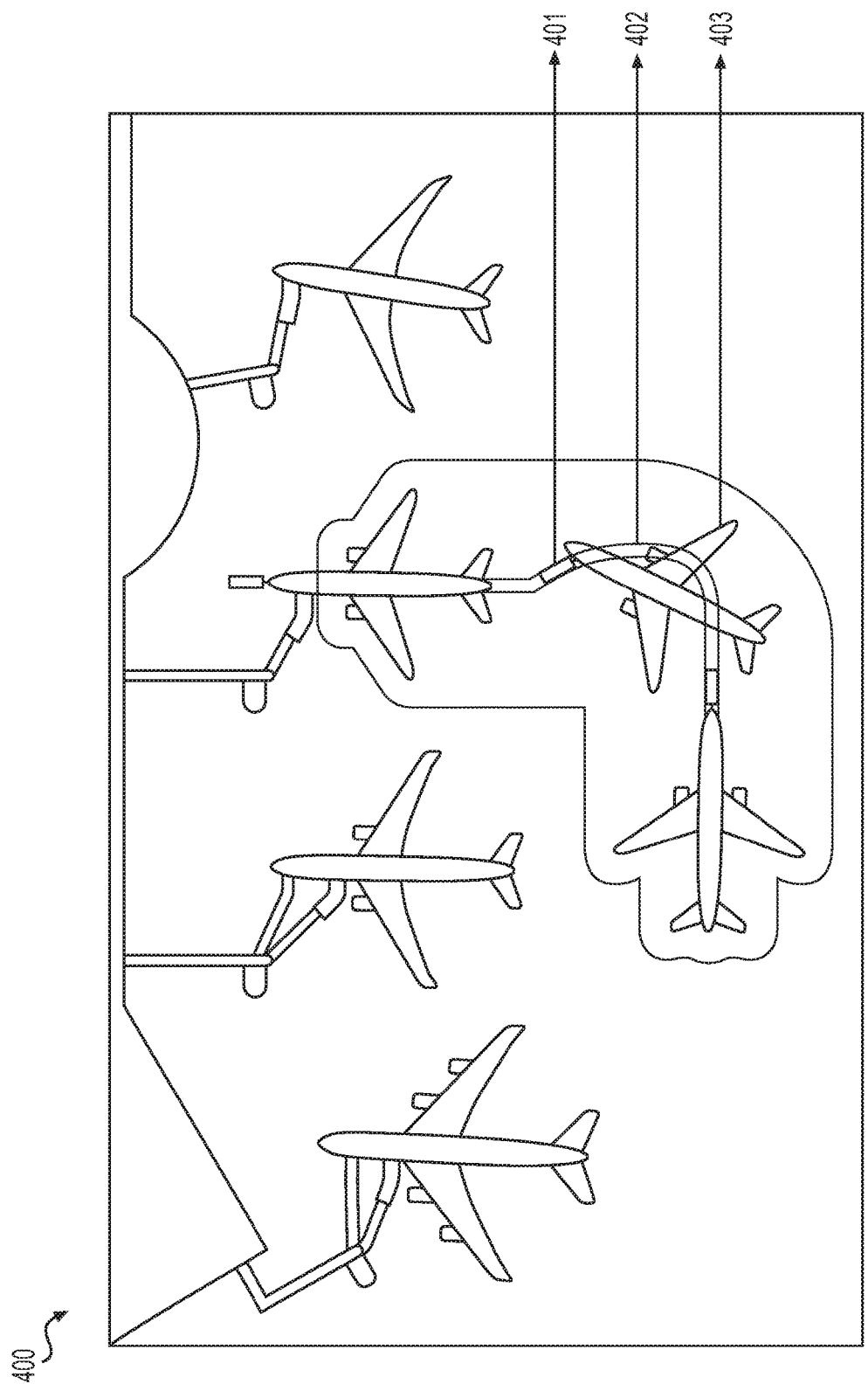
FIG. 4 depicts an exemplary graphics display of the vehicle collision notification and avoidance system, according to one aspect of the present disclosure.

FIG. 4 depicts an exemplary graphics display 400 of the vehicle collision notification and avoidance system, according to one aspect of the present disclosure.

Display 400 may include tug vehicle 401, aircraft pushback trajectory path 402, and aircraft direction 403. Aircrafts are push backed with tug vehicle 401 and the display 400 may assist the tug driver to move the aircraft in reverse as it is simultaneously being turned to a location where the aircraft can start its engines and move forward to a taxiway. The display 400 may display to the tug driver via a live video feed provided by the attachable camera 110 the aircraft pushback trajectory path 402 and aircraft direction 403 for the tug driver to follow. In one embodiment, the pushback aircraft may not broadcast the position information, for example during pushback operation when the ADS-B is off, the position of pushback aircraft may be computed based on information provided by the GPS receiver of the tug vehicle. The information provided by the GPS receiver may include the velocity, acceleration, and direction of the tug vehicle. The information of the tug vehicle may be passed to the collision prediction module 212 to predict the next possible position at time "t+delta" using regression models, where "t" is the current time. In another embodiment, the display 400 may use the live video feeds from the coupled cameras to build a 360 degree view of the surroundings of the pushback aircraft, any warnings to potential collisions may be provided as an augmentation to the live video feed. For example, displaying green lines to indicate safe distance from other obstacles, and red lines to indicate potential collisions. The tug driver may then use the display 400 to assist in pushback operation to avoid any possible collisions.

Although FIG. 4 shows examples of user interface, in some implementations, user interface 400 may have additional graphic objects, fewer graphic objects, or different graphic objects.

Figure 5:
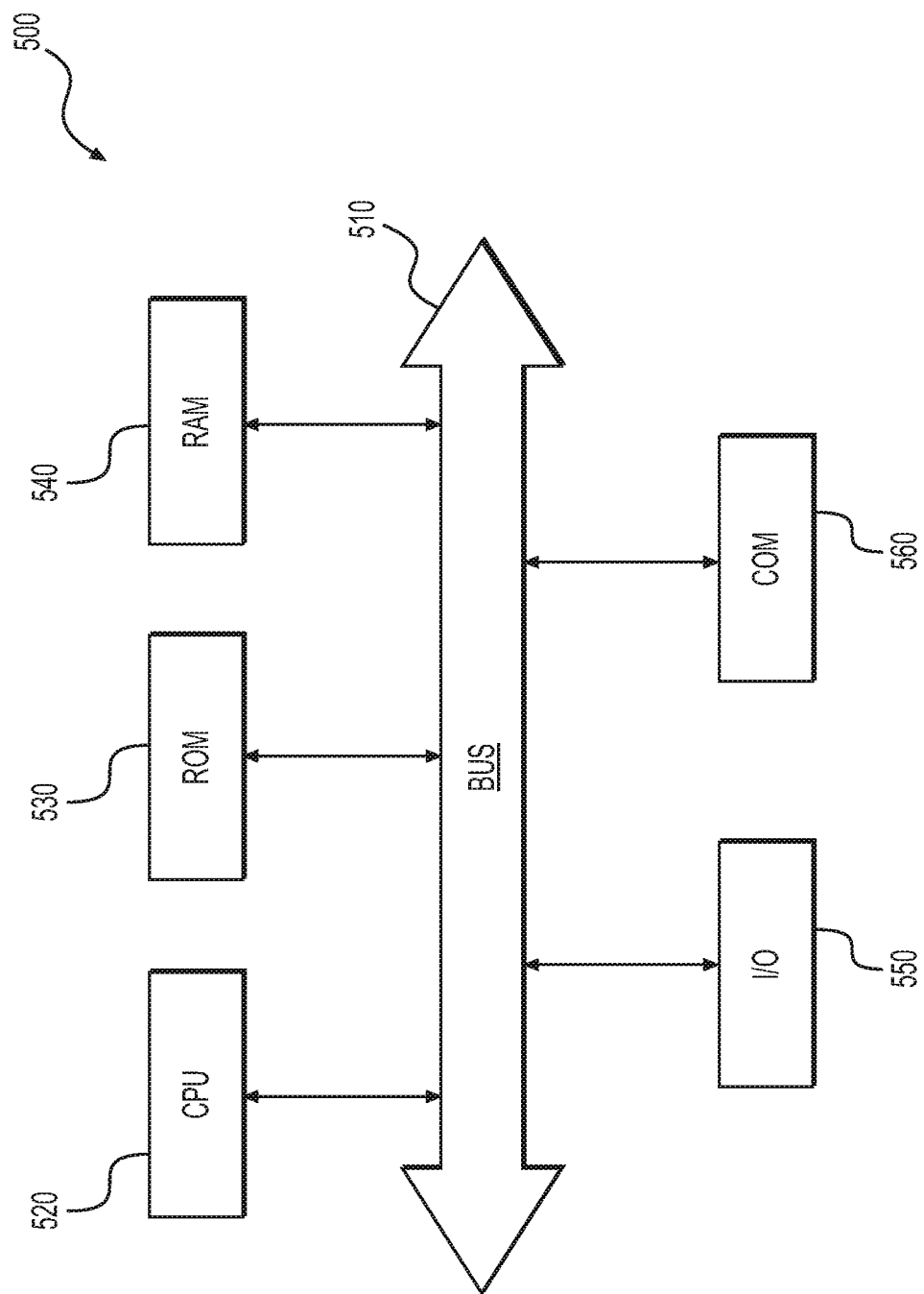
FIG. 5 depicts an exemplary computer device or system, in which embodiments of the present disclosure, or portions thereof, may be implemented.

FIG. 5 depicts a high-level functional block diagram of an exemplary computer device or system, in which embodiments of the present disclosure, or portions thereof, may be implemented, e.g., as computer-readable code. In some implementations, the pushback assistance application may correspond to device 500. Additionally, or alternatively, the pushback collision prevention system 210 may correspond to device 500. Additionally, each of the exemplary computer servers, databases, user interfaces, modules, and methods described above with respect to FIGS. 1-4 can be implemented in device 500 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-4.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-4, may be implemented using device 500. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 5, device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multi-processor system, such system operating alone, or in a cluster of computing devices operating in a cluster or server farm. CPU 520 may be connected to a data communication infrastructure 510, for example, a bus, message queue, network, or multi-core message-passing scheme.

Device 500 also may include a main memory 540, for example, random access memory (RAM), and also may include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

Device 500 also may include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for vehicle collision notification and avoidance, the method comprising:
   receiving a field of view video of at least one camera coupled to a vehicle;
   transmitting the field of view video of the at least one camera coupled to the vehicle to a user device;
   receiving vehicle information regarding the vehicle from the at least one camera or one or more databases;
   receiving other vehicle information from the at least one camera or the one or more databases, the other vehicle information regarding at least one other vehicle in the field of view video of the at least one camera coupled to the vehicle;
   receiving geographic information regarding a location of the vehicle and the other vehicle from the at least one camera or the one or more databases;
   predicting a next position of the vehicle based on the vehicle information and the geographic information;
   predicting a next position of the other vehicle based on the other vehicle information and the geographic information;

determining whether the vehicle will collide with the other vehicle based on a comparison of the next position of the vehicle to the next position of the other vehicle;

generating a graphical representation in the field of view video of the at least one camera coupled to the vehicle, wherein the graphical representation represents the collision of the vehicle and the other vehicle; and transmitting the graphical representation of the collision of the vehicle and the other vehicle to the user device.

2. The computer-implemented method of claim 1, wherein the at least one camera is removably coupled to the vehicle and the at least one camera coupled to the vehicle is selected from RGB camera, IR camera, thermal camera, and RGB-D camera.

3. The computer-implemented method of claim 1, wherein the vehicle information and the other vehicle information include at least one of, position information, speed information, aircraft structural information, aircraft safe zone radius ring information, and wing tip separation clearance distance information.

4. The computer-implemented method of claim 1, wherein the location of the vehicle is obtained from, a GPS receiver on the vehicle, or a tug vehicle connected to the vehicle.

5. The computer-implemented method of claim 1, wherein the geographic information include at least one of, aircraft taxiway clearance path, airport surface guidance line information, historical pushback trajectory information, and airport surface information.

6. The computer-implemented method of claim 1, wherein predicting a next position of the vehicle and the other vehicle comprise using computer vision and regression model.

7. The computer-implemented method of claim 1, wherein the user device is one of smartphones, laptops, tablets, desktop computers, smart glasses, virtual reality headsets, augmented reality headsets, and smart watches.

8. A computer-implemented system for vehicle collision notification and avoidance, the computer-implemented system comprising:

a memory having processor-readable instructions stored therein; and at least one processor configured to access the memory and execute the processor-readable instructions, which when executed by the processor configures the processor to perform functions for:

receiving a field of view video of at least one camera coupled to a vehicle;

transmitting the field of view video of the at least one camera coupled to the vehicle to a user device;

receiving vehicle information regarding the vehicle from the at least one camera or one or more databases;

receiving other vehicle information from the at least one camera or the one or more databases, the information regarding at least one other vehicle in the field of view video of the at least one camera coupled to the vehicle;

receiving geographic information regarding a location of the vehicle and the other vehicle from the at least one camera or the one or more databases;

predicting a next position of the vehicle based on the vehicle information and the geographic information;

predicting a next position of the other vehicle based on the other vehicle information and the geographic information;

determining whether the vehicle will collide with the other vehicle based on a comparison of the next position of the vehicle to the next position of the other vehicle;

generating a graphical representation in the field of view video of the at least one camera coupled to the vehicle, wherein the graphical representation represents the collision of the vehicle and the other vehicle; and transmitting the graphical representation of the collision of the vehicle and the other vehicle to the user device.

9. The computer-implemented system of claim 8, wherein the at least one camera coupled to the vehicle is selected from RGB camera, IR camera, thermal camera, and RGB-D camera.

10. The computer-implemented system of claim 8, wherein the vehicle information and the other vehicle information include at least one of, position information, speed information, aircraft structural information, aircraft safe zone radius ring information, and wing tip separation clearance distance information.

11. The computer-implemented system of claim 8, wherein the location of the vehicle is obtained from, a GPS receiver on the vehicle, or a tug vehicle connected to the vehicle.

12. The computer-implemented system of claim 8, wherein the geographic information include at least one of, aircraft taxiway clearance path, airport surface guidance line information, historical pushback trajectory information, and airport surface information.

13. The computer-implemented system of claim 8, wherein predicting a next position of the vehicle and the other vehicle comprise using computer vision and regression model.

14. The computer-implemented system of claim 8, wherein the user device is one of smartphones, laptops, tablets, desktop computers, smart glasses, virtual reality headsets, augmented reality headsets, and smart watches.

15. A non-transitory computer-readable medium containing instructions for vehicle collision notification and avoidance, comprising:

receiving a field of view video of at least one camera coupled to a vehicle;

transmitting the field of view video of the at least one camera coupled to the vehicle to a user device;

receiving vehicle information regarding the vehicle from the at least one camera or one or more databases;

receiving other vehicle information from the at least one camera or the one or more databases, the information regarding at least one other vehicle in the field of view video of the at least one camera coupled to the vehicle;

receiving geographic information regarding a location of the vehicle and the other vehicle from the at least one camera or the one or more databases;

predicting a next position of the vehicle based on the vehicle information and the geographic information;

predicting a next position of the other vehicle based on the other vehicle information and the geographic information;

determining whether the vehicle will collide with the other vehicle based on a comparison of the next position of the vehicle to the next position of the other vehicle;

generating a graphical representation in the field of view video of the at least one camera coupled to the vehicle, wherein the graphical representation represents the collision of the vehicle and the other vehicle; and transmitting the graphical representation of the collision of the vehicle and the other vehicle to the user device.

16. The non-transitory computer-readable medium of claim 15, wherein the at least one camera coupled to the vehicle is selected from RGB camera, IR camera, thermal camera, and RGB-D camera.

17. The non-transitory computer-readable medium of claim 15, wherein the vehicle information and the other vehicle information include at least one of, position information, speed information, aircraft structural information, aircraft safe zone radius ring information, and wing tip separation clearance distance information.

18. The non-transitory computer-readable medium of claim 15, wherein the location of the vehicle is obtained from, a GPS receiver on the vehicle, or a tug vehicle connected to the vehicle.

19. The non-transitory computer-readable medium of claim 15, wherein the geographic information include at least one of, aircraft taxiway clearance path, airport surface guidance line information, historical pushback trajectory information, and airport surface information.

20. The non-transitory computer-readable medium of claim 15, wherein predicting a next position of the vehicle and the other vehicle comprise using computer vision and regression model.

* * * * *